(12) United States Patent  (10) Patent No.: US 7,537,191 B2
Wynn  (45) Date of Patent: May 26, 2009

(54) MOUNTING DEVICE

(76) Inventor: Bill Wynn, 13909 Homeward St., La Puente, CA (US) 91746

( * ) Notice: Subject to any disclaimer, the term of this patent is extended or adjusted under 35 U.S.C. 154(b) by 0 days.

(21) Appl. No.: 11/643,260

(22) Filed: Dec. 20, 2006

(65) Prior Publication Data
US 2007/0138364 A1    Jun. 21, 2007

Related U.S. Application Data

(60) Provisional application No. 60/752,757, filed on Dec. 20, 2005.

(51) Int. Cl.
A47F 5/00 (2006.01)
(52) U.S. Cl. .................... 248/309.1; 248/304
(58) Field of Classification Search ............. 248/309.1, 248/339, 340, 304, 317, 48.2; 362/396
See application file for complete search history.

(56) References Cited

U.S. PATENT DOCUMENTS

| 3,749,346 | A | * | 7/1973 | Cherniak | 248/302 |
| 4,244,014 | A | | 1/1981 | Van Ess | 362/249 |
| 4,774,646 | A | | 9/1988 | L'Heureux | 362/249 |
| 5,056,747 | A | | 10/1991 | Kireta | 248/231.8 |
| 5,141,192 | A | | 8/1992 | Adams | 248/231.8 |
| 5,388,802 | A | | 2/1995 | Dougan et al. | 248/74.2 |
| 5,623,789 | A | | 4/1997 | Kidwell et al. | 52/28 |
| 6,186,644 | B1 | | 2/2001 | Mosseau | 362/249 |
| 6,352,291 | B1 | | 3/2002 | Tortajada | 294/24 |
| 6,572,062 | B1 | * | 6/2003 | Limber et al. | 248/227.1 |
| 6,585,394 | B2 | | 7/2003 | Diaco | 362/249 |
| 6,644,836 | B1 | | 11/2003 | Adams | 362/396 |
| 6,663,069 | B1 | * | 12/2003 | Norberg | 248/316.7 |
| 6,807,791 | B2 | * | 10/2004 | Herb | 52/732.1 |

* cited by examiner

Primary Examiner—Ramon O Ramirez
(74) Attorney, Agent, or Firm—The Eclipse Group LLP

(57) ABSTRACT

A mounting device is provided for extending at least part of a line article along at least part of a structure. The mounting device includes a mounting platform having a base and two resilient legs extending from the base, where each of the two resilient legs has a free end such that a first distance between the two resilient legs is shorter than a second distance between the two resilient legs parallel to the first distance, and where the two resilient legs together form mutually opposing points of contact capable of securing the mounting device onto a structure. The mounting device further includes at least two retaining mechanisms extending from the mounting platform, where the first and second retaining mechanisms are mutually positioned to be together capable of extending at least part of a line article in any direction along at least part of such a structure, regardless of the direction in which the mounting device is secured by the two resilient legs on the structure.

18 Claims, 10 Drawing Sheets

MOUNTING DEVICE

RELATED APPLICATIONS

This application claims priority to U.S. Provisional Patent Application Ser. No. 60/752,757, filed Dec. 20, 2005, titled MOUNTING DEVICE, which application is incorporated in its entirety by reference in this application.

BACKGROUND OF THE INVENTION

1. Field of the Invention

The invention relates to a device for securing line articles along structures.

2. Related Art

Many circumstances exist where it is desirable to secure a line article, such as a corded article, to a structure and, in particular, to the perimeter or edge of a structure. For example, it may be desirable, during special occasions or holidays, to secure lighting around the perimeter of a structure, such as along the fascia board of the roof of a home, along a fence, around an archway, under a skywalk, or any other indoor or outdoor decorative or functional structure. In some cases, it may be desirable to secure the line article on a temporary basis or a semi-permanent basis. Depending upon the structure, it may be desirable to secure the line article on irregular parts of a structure, such as along fascia boards, rafters, or posts, facing in a variety of directions.

The elongated dimension of a line article contributes to the challenges of securing the line article on such surfaces. Portions of a line article often need to conform to various different directions on various different parts of the structure. In all of these situations, attachment of a line article onto a structure using conventional fasteners such as nails, screws or staples, can be difficult to accomplish, unduly permanent for a given application and/or damaging to the structure.

A continuing need therefore exists for a mounting device capable of securing a line article onto a structure, regardless of a direction in which the line article needs to be oriented along the structure.

SUMMARY

In an example of one implementation, a mounting device is provided for extending at least part of a line article along at least part of a structure. The mounting device includes a mounting platform having a base and two resilient legs extending from the base, where each of the two resilient legs has a free end such that a first distance between the two resilient legs is shorter than a second distance between the two resilient legs parallel to the first distance, and where the two resilient legs together form mutually opposing points of contact capable of securing the mounting device onto a structure. The mounting device further includes at least two retaining mechanisms extending from the mounting platform, where the at least two retaining mechanisms are mutually positioned to be together capable of extending at least part of a line article in any direction along at least part of such a structure, regardless of the direction in which the mounting device is secured by the two resilient legs on the structure.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

A mounting device is provided for extending at least part of a line article along at least part of a structure. As illustrated and described in connection with FIGS. 1-4 below, the mounting device has a mounting platform including a base and two resilient legs extending from the base and at least two retaining mechanisms extending from the mounting platform. Each of the two resilient legs has a free end where a first distance between the two resilient legs is shorter than a second distance between the two resilient legs parallel to the first distance. The two resilient legs together form mutually opposing points of contact capable of securing the mounting device to a structure, and in particular, to the edge or perimeter of the structure. The at least two retaining mechanisms are mutually positioned to together be capable of extending at least part of a line article in any direction along at least part of such a structure, regardless of a direction in which the mounting device is secured by the two resilient legs on such a structure. In another example of an implementation, the mounting device may include more than two retaining mechanisms extending from the mounting platform, as will be described in FIGS. 5-8 below.

Figure 1:
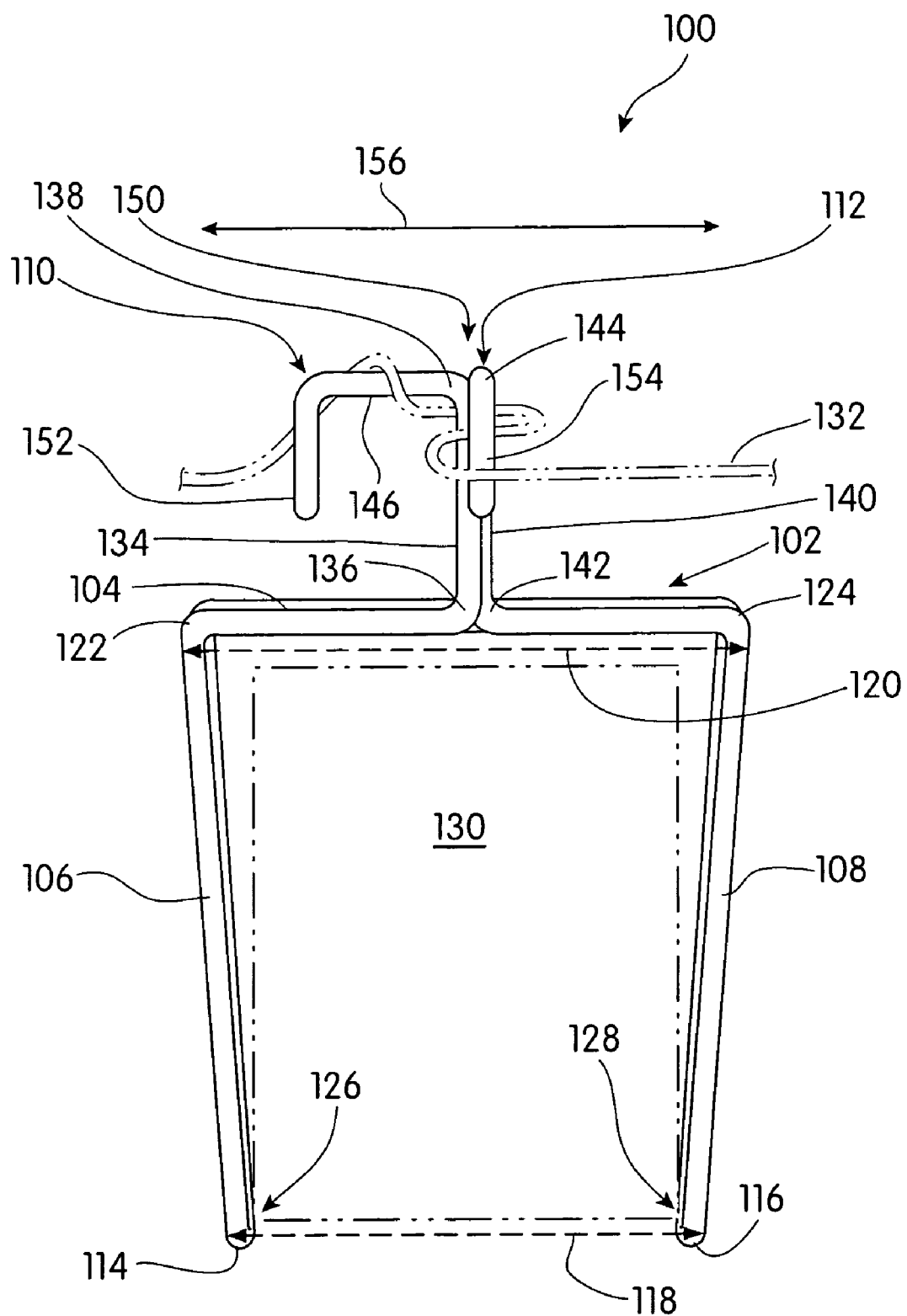
FIG. 1 is a side view showing an example of an implementation of a mounting device.
Figure 2:
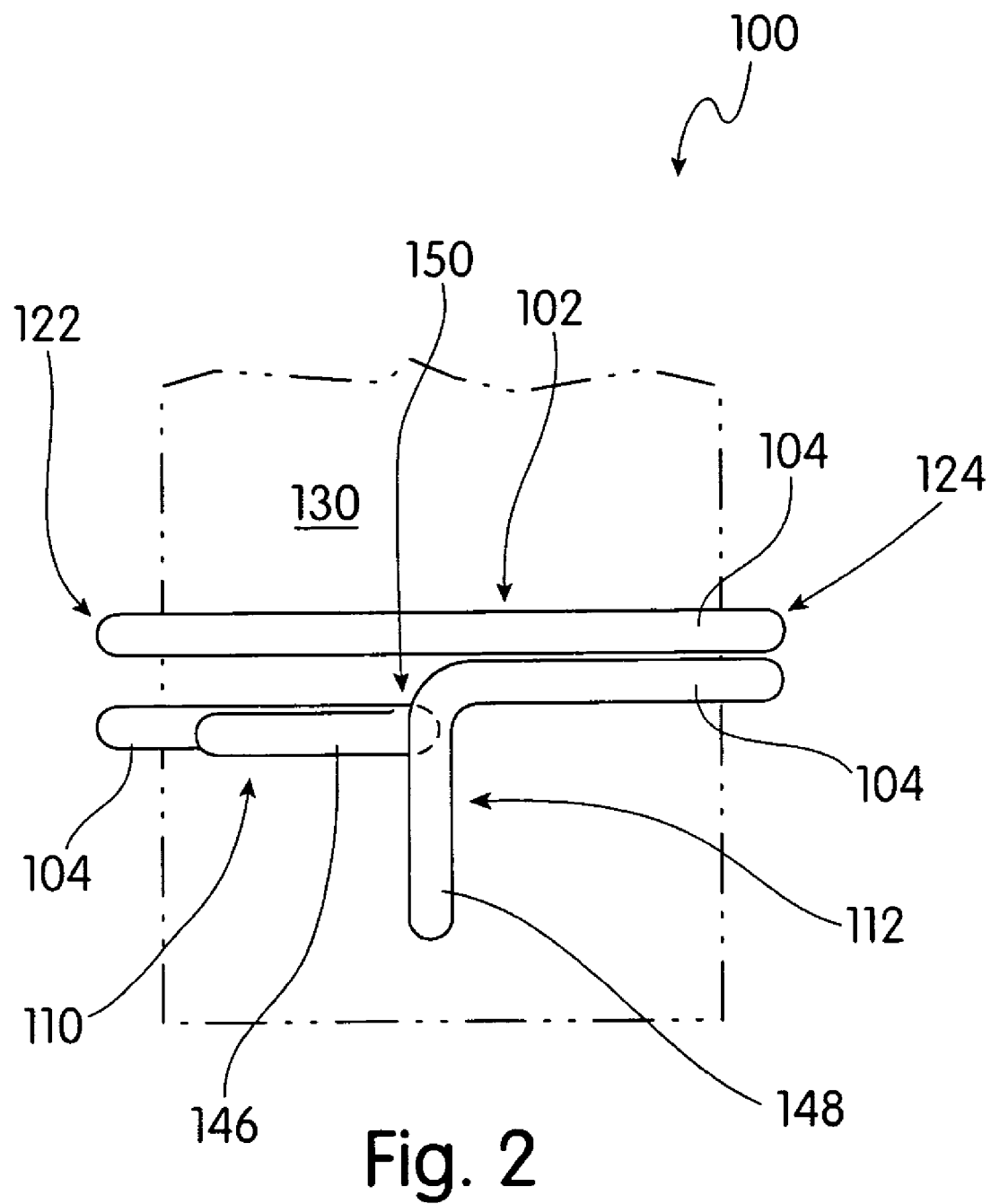
FIG. 2 is a top view of the mounting device shown in FIG. 1.
Figure 3:
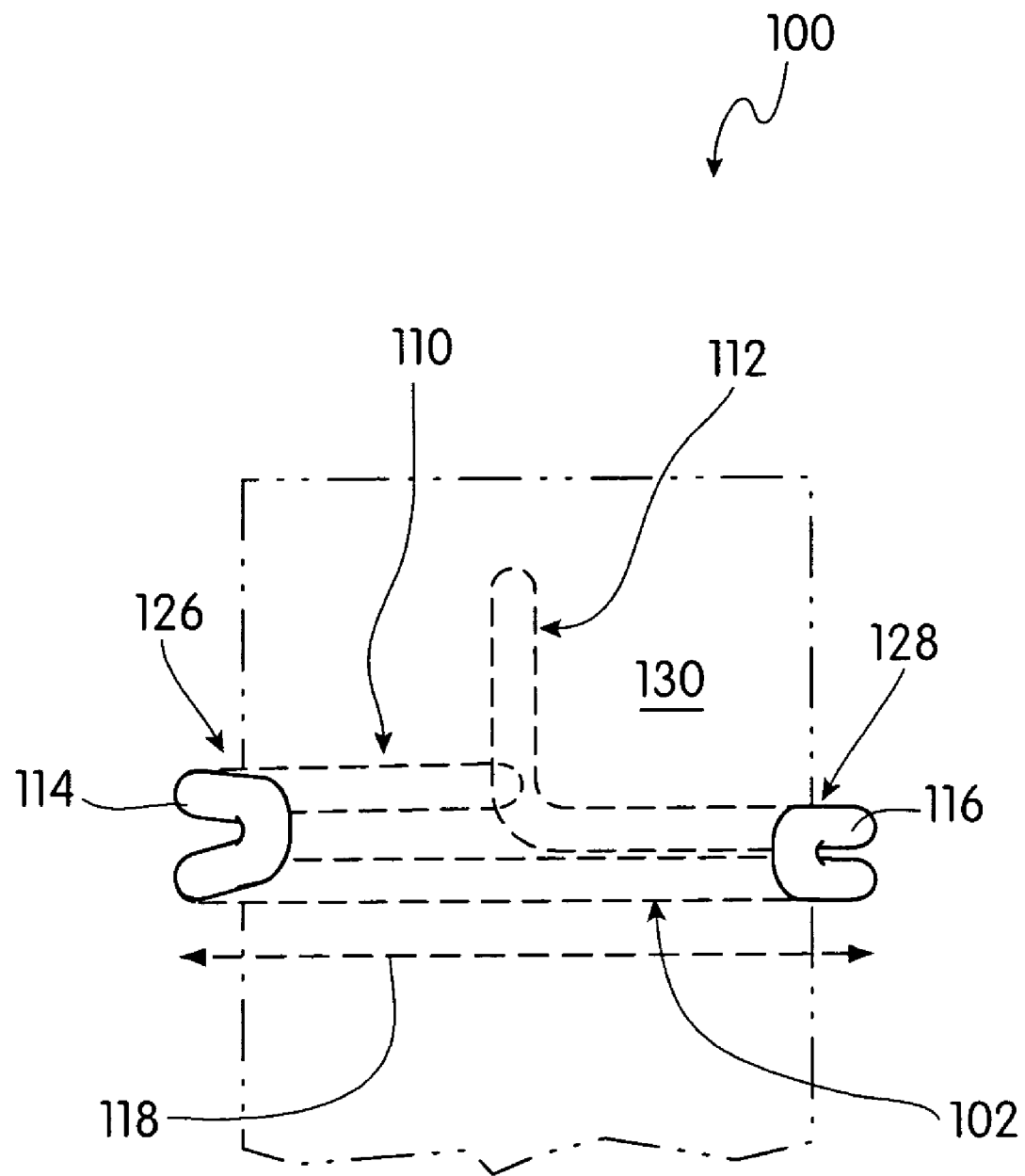
FIG. 3 is a bottom view of the mounting device shown in FIG. 1.
Figure 4:
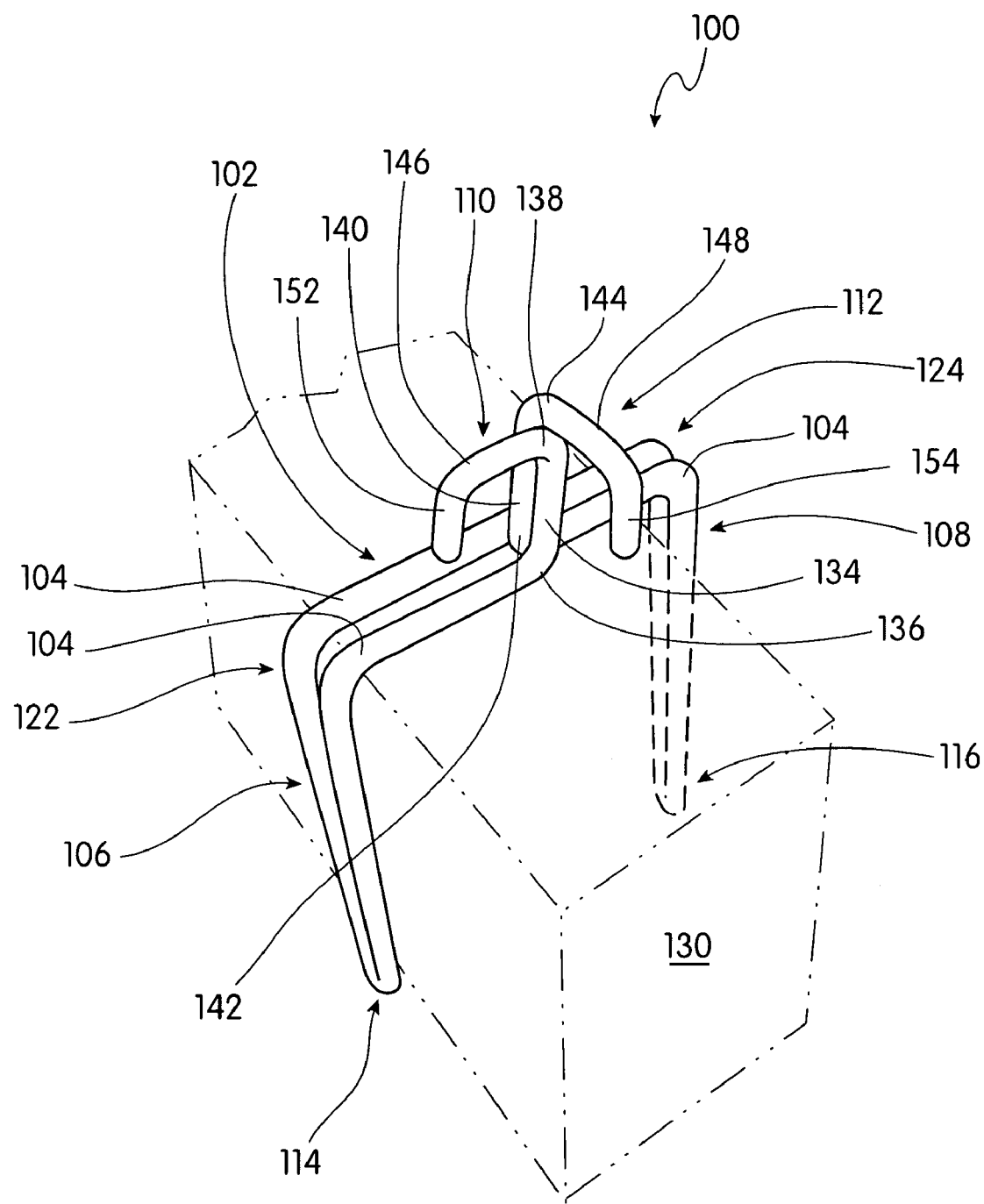
FIG. 4 is a perspective view of the mounting device shown in FIG. 1.

FIG. 1 is a side view showing an example of one implementation of a mounting device 100. FIG. 2 is a top view of the mounting device 100 shown in FIG. 1. FIG. 3 is a bottom view of the mounting device 100 shown in FIG. 1, and FIG. 4 is a perspective view of the mounting device 100 shown in FIG. 1. The mounting device 100 includes a mounting platform 102 having a base 104 and two resilient legs 106 and 108 extending from the base 104. The mounting device 100 further includes a first retaining mechanism 110 and a second retaining mechanism 112 both extending from the mounting platform 102. The two resilient legs 106 and 108 have free ends 114 and 116, respectively. A first distance between the resilient legs 106 and 108 is shorter than a second distance between the resilient legs 106 and 108 located parallel to the first distance. In an example, a first distance between the resilient legs 106 and 108, indicated by a dotted line 118, may be shorter than a second distance between the resilient legs 106 and 108 indicated by a dotted line 120. The resilient legs 106 and 108 may be designed to be flexible, as well as resilient, such that the resilient legs 106 and 108 may have a tendency to restore the first distance indicated by the dotted line 118 following displacement of the free ends 114, 116 away from each other. The resilient legs 106, 108 may extend from ends 122, 124 of the base 104, or (not shown) the resilient legs 106, 108 may each independently extend from other positions on the base 104 between the ends 122, 124. The resilient legs 106, 108 may, for example, both extend from the base 104 in generally similar directions, and the dotted line 118 intersecting the free ends 114 and 116 may be parallel with the dotted line 120 intersecting the ends 122, 124. As a further example, a distance between the free ends 114 and 116 indicated by the dotted line 118 may be shorter than a distance between the ends 122, 124 indicated by the dotted line 120. The two resilient legs 106 and 108 form mutually opposing points of contact 126 and 128, respectively. The mutually opposing points of contact 126 and 128 are together capable of forming a friction fit pinching adjacent surfaces of a structure 130 on which the mounting device 100 may be secured. The free ends 114, 116 may be bent as shown in FIG. 3 so as to be able to curl around a structure 130, or may be straight (not shown). As an example, each of the mutually opposing points of contact 126 and 128 independently may be located at a selected position on the resilient legs 106, 108 respectively, between the base 104 and the free ends 114, 116 respectively. In an additional example, either or both of the resilient legs 106, 108 may include more than one point of contact for securing the mounting device 100 on a structure 130. While the above discussion describes a mounting device 100 capable of securing itself against a structure 130 using a friction fit obtained using resilient legs 106 and 108, those skilled in the art will recognize that other methods for securing the mounting device 100 may be utilized and are intended to be within the scope of the invention. Alternatively, other structural designs may be utilized to create a friction fit for securing the mounting device 100 against the structure 130.

The first and second retaining mechanisms 110 and 112 may be positioned in sufficient mutual proximity extending from the mounting platform 102 so as to together be capable of extending at least part of a line article 132 on the mounting device 100. The first and second retaining mechanisms 110 and 112 may be together capable of extending at least part of the line article 132 in any direction along at least part of such a structure 130. The first and second retaining mechanisms 110 and 112 may together have these capabilities regardless of the direction in which the mounting device 100 is secured by the two resilient legs 106 and 108 on such a structure 130. In an example (not shown), the mounting device 100 may include a second mounting platform oriented orthogonally with respect to the mounting platform 102, having two additional resilient legs including two additional mutually opposing points of contact positioned for securing the mounting device 100 onto a structure 130. A mounting device 100 including two such mutually orthogonal mounting platforms 102 may be utilized, for example, to extend at least part of a line article 132 in any direction along at least part of an end of a structure 130, such as an end of a post.

In an example, the structure 130 on which a mounting device 100 may be secured for extending a portion of a line article 132 may include a beam positioned in a fixed location. A beam may, for example, include an elongated structure having a generally square, rectangular, circular, ellipsoid, or other polygonal cross-section as defined transversely to the elongation of the structure. The structure 130 may include a beam affixed to a building or to another functional structure. In examples, the beam may include a fascia board, a rafter, a decking board, a post, or part of a truss. Examples of buildings may include a dwelling, a commercial building, a shade structure, a canopy, and a storage building. Examples of other functional structures may include a landscape structure, a deck, a gazebo, a patio structure, a lighting post, a street sign, a fence, a railing, a stairway, a balcony, an arbor, and a trellis. It is understood by those skilled in the art that these examples of structures 130 are non-limiting, and that the mounting device 100 may be affixed onto any indoor or outdoor structure 130 as to which the mutually opposing points of contact 126 and 128 are effective to form an attachment.

The line article 132 may include part of any article, device, or apparatus having an overall line-like structure, such as a cable, filament, rope, strand, string, thread, wire, cord, or vine. The line article 132 may include, for example, part of a corded article having one or more electronic devices spaced apart along and electrically connected with an electrical cord. The line article 132 may, for example, include part of a string of electric lights mounted in a spaced-apart array on an electrical cord. As another example, the line article 132 may include part of a climbing vine plant.

In an example, the mounting device 100 may include a limb 134 having a first limb end 136 and a second limb end 138. The first limb end 136 may extend from the mounting platform 102. The first limb end 136 may be oriented, for example, perpendicular to an adjacent part of the mounting platform 102. The second limb end 138 may be spaced apart from the mounting platform 102. The limb 134 may, as an example, form part of the first retaining mechanism 110. The mounting device 100 may, for example, include a limb 140 having a first limb end 142 and a second limb end 144. The first limb end 142 may extend from the mounting platform 102. The first limb end 142 may be oriented, for example, perpendicular to an adjacent part of the mounting platform 102. The second limb end 144 may be spaced apart from the mounting platform 102. The limb 140 may form part of the second retaining mechanism 112. Each of the limbs 134, 140 may, as an example, be mounted at selected positions extending from the mounting platform 102, positioned in sufficient mutual proximity so as to be together capable of extending at least part of the line article 132 in any direction along at least part of a structure 130. In examples, the limbs 134, 140 may be mounted extending from the base 104, or (not shown) extending from the resilient leg 106 or extending from the resilient leg 108. The limbs 134, 140 may be mounted extending from the mounting platform 102 in locations selected to leave adequate clearance between the resilient legs 106 and 108 for positioning the mounting device 100 on a structure 130. The limbs 134, 140 may be mounted extending from the mounting platform 102 in locations selected so as not to interfere with utilization of the points of contact 126, 128 for positioning the mounting device 100 on a structure 130. In another example, the limb 134 and the limb 140 may be combined together into a single limb 134 forming part of the first retaining mechanism 110 and also forming part of the second retaining mechanism 112. It is understood that the mounting device 100 may include more than one limb 134 (not shown), each such limb being positioned in different locations extending from the mounting platform 102 and forming parts of first and second retaining mechanisms.

In an example, the first retaining mechanism 110 may include an arm 146 extending from the limb 134, and the second retaining mechanism 112 may include an arm 148 extending from the limb 140. The arms 146 and 148 may, for example, be mutually perpendicular. The arms 146 and 148 may together form a cross-piece 150 oriented transversely to and in proximity with both of the limbs 134, 140 and spaced apart from the mounting platform 102. In another example (not shown), the arms 146 and 148 may be mutually parallel, forming a "T-shaped" element together with the limbs 134, 140 oriented transversely to and in proximity with both of the limbs 134, 140 and spaced apart from the mounting platform 102. Where a limb 134 forms (not shown) part of both of the first and second retaining mechanisms 110 and 112, the arms 146 and 148 may be oriented transversely to and form an integrated cross-piece 150 extending from the limb 134 and spaced apart from the mounting platform 102. The cross-piece 150 may, for example, be oriented perpendicular with respect to the limbs 134, 140 and coplanar with respect to part of the mounting platform 102 adjacent to the first and first limb ends 136, 142. The arms 146 and 148 may extend from the second limb ends 138, 144 respectively. As an example, the arm 146 may include an appendage 152, and the arm 148 may include an appendage 154. The appendages 152, 154 may, for example, extend toward the mounting platform 102. The appendages 152, 154 may extend sufficiently far toward the mounting platform 102 so as to make contact with a structure 130 when the mounting device 100 is secured by the resilient legs 106, 108 on a structure 130.

The limbs 134, 140, together with the cross-piece 150 positioned in proximity with the limbs 134, 140 and spaced apart from the mounting platform 102, may be capable of extending at least part of the line article 132 in any direction along at least part of a structure 130. The limbs 134, 140 and the cross-piece 150 may collectively facilitate weaving part of the line article 132 securely on the mounting device 100 regardless of directions in which the mounting device 100 is mounted on the structure 130 and regardless of a direction of travel 156 of the line article 132. As an example, part of a line article 132 may pass behind and then over the arm 146, then behind the limbs 134, 140, under the arm 148, and around the appendage 154. It is understood by those skilled in the art that FIG. 1 showing part of a line article 132 on a mounting device 100 is merely an example, and that part of a line article may be extended on the mounting device 100 in many other different orientations. It is further understood by those skilled in the art that the figures showing a mounting device 100 oriented with limbs 134, 140 above the base 104 when the mounting device 100 is secured on the structure 130 are merely examples, and that the limbs 134, 140 as well as the first and second retaining mechanisms 110, 112, and the resilient legs 106, 108 may each independently be oriented horizontally, or downward, or at any other selected orientation between a vertically upward or downward or a horizontal position.

Lengths of the resilient legs 106, 108, defined as distances between the free ends 114, 116 and the base 104, may be sufficiently great to enable the mounting device 100 to be secured onto a structure 130, and may for example be as long as needed so that the resilient legs 106, 108 may span a dimension of a structure 130 onto which the mounting device 100 may be secured. As an example, such lengths of the resilient legs 106, 108 may be within a range of between about one inch and about twelve inches. A length of the base 104, defined as a distance between the ends 122, 124, may likewise be sufficiently great to enable the mounting device 100 to be secured onto a structure 130, and may for example be as long as needed so that the resilient legs 106, 108 may span a dimension of a structure 130 onto which the mounting device 100 may be secured. As an example, such a length of the base 104 may be within a range of between about one inch and about twelve inches. Lengths of the limbs 134, 140 may be sufficiently great to enable a portion of a line article 132 to be positioned on the first and second retaining mechanisms 110, 112, and may be as long as having utility in an application. For example, lengths of such limbs may each independently be within a range of between about one-quarter inch and about twelve inches. Lengths of the arms 146, 148 and the appendages 152, 154 may, for example, be selected for compatibility with a cross-section of a portion of a line article 132 to be extended by the first and second retaining mechanisms 110, 112. For example, the lengths of such arms 146, 148 and appendages 152, 154 may each independently be within a range of between about one-quarter inch and about three inches. It is understood by those skilled in the art that these ranges of lengths are merely examples, and that other lengths may be utilized.

As an example, the first retaining mechanism 110 may include a first hook. In another example, the second retaining mechanism 112 may include a second hook. The limb 134, the arm 146 and the appendage 152 may form parts of the first hook; and the limb 140, the arm 148 and the appendage 154 may form parts of the second hook. It is understood by those skilled in the art that the positions of the first and second hooks shown in the figures are merely examples, and that the first and second retaining mechanisms 110, 112 may each independently be positioned at any selected orientation with respect to the mounting platform 102. In additional examples (not shown), the first and second retaining mechanisms 110, 112 may each independently include, positioned on the mounting platform 102, on the limbs 134, 140, on the arms 146, 148, or on the appendages 152, 154, a hook, fastener, bolt, buckle, clamp, clip, hasp, latch, catch, holder, or the like. The first and second retaining mechanisms 110, 112 may each independently have selected dimensions and a selected overall size, which may be the same or different. As further examples (not shown), the first and second retaining mechanisms 110, 112 may each independently be removeably attachable to, or permanently attached to but selectively moveable on, the mounting platform 102, the limbs 134, 140, the arms 146, 148, or the appendages 152, 154. The first and second retaining mechanisms 110, 112 may, for example, be repositionable or reconfigurable on the mounting platform 102. Any or all of the base 104, the resilient legs 106, 108, the limbs 134, 140, the arms 146, 148, and the appendages 152, 154 may include (not shown) recesses for attachment of retaining mechanisms 110, 112 each in the form of a hook, fastener, bolt, buckle, clamp, clip, hasp, latch, catch, holder, or the like. The retaining mechanisms 110, 112 may include (not shown) securing mechanisms for their removable attachment at predetermined or randomly selected positions to any or all of the base 104, the resilient legs 106, 108, the limbs 134, 140, the arms 146, 148, and the appendages 152, 154.

Figure 5:
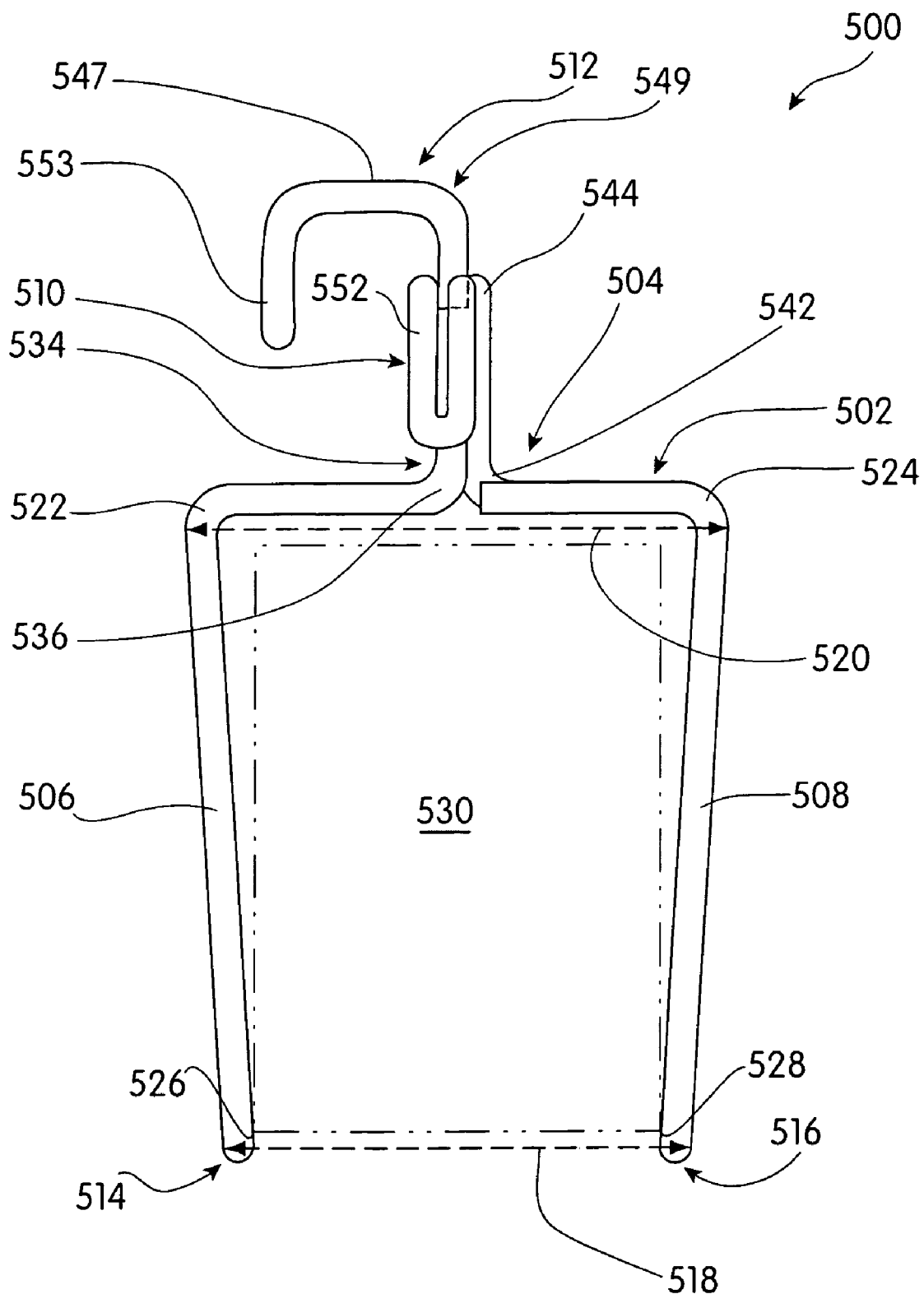
FIG. 5 is a side view showing another example of an implementation of a mounting device.
Figure 6:
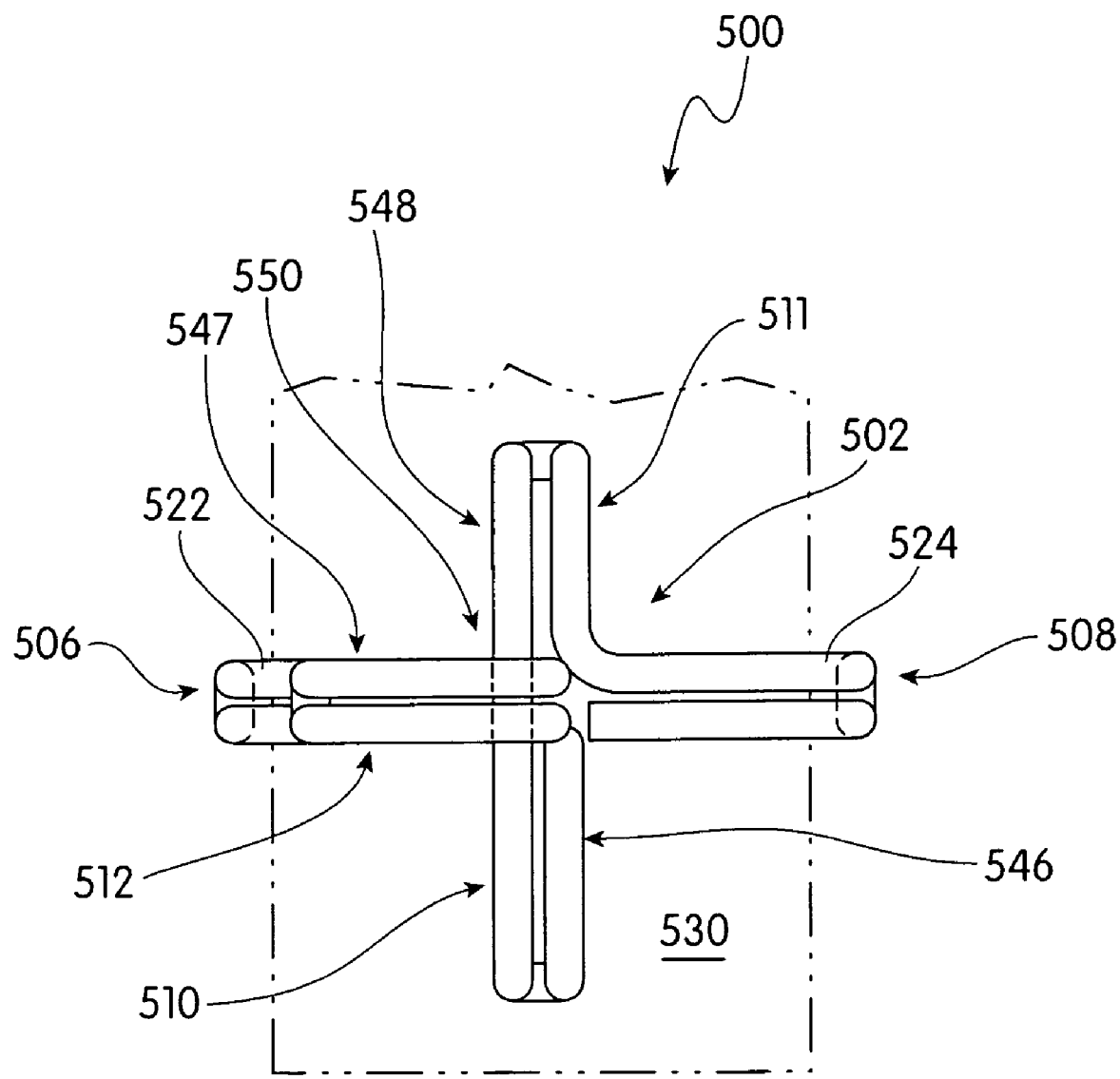
FIG. 6 is a top view of the mounting device shown in FIG. 5.
Figure 7:
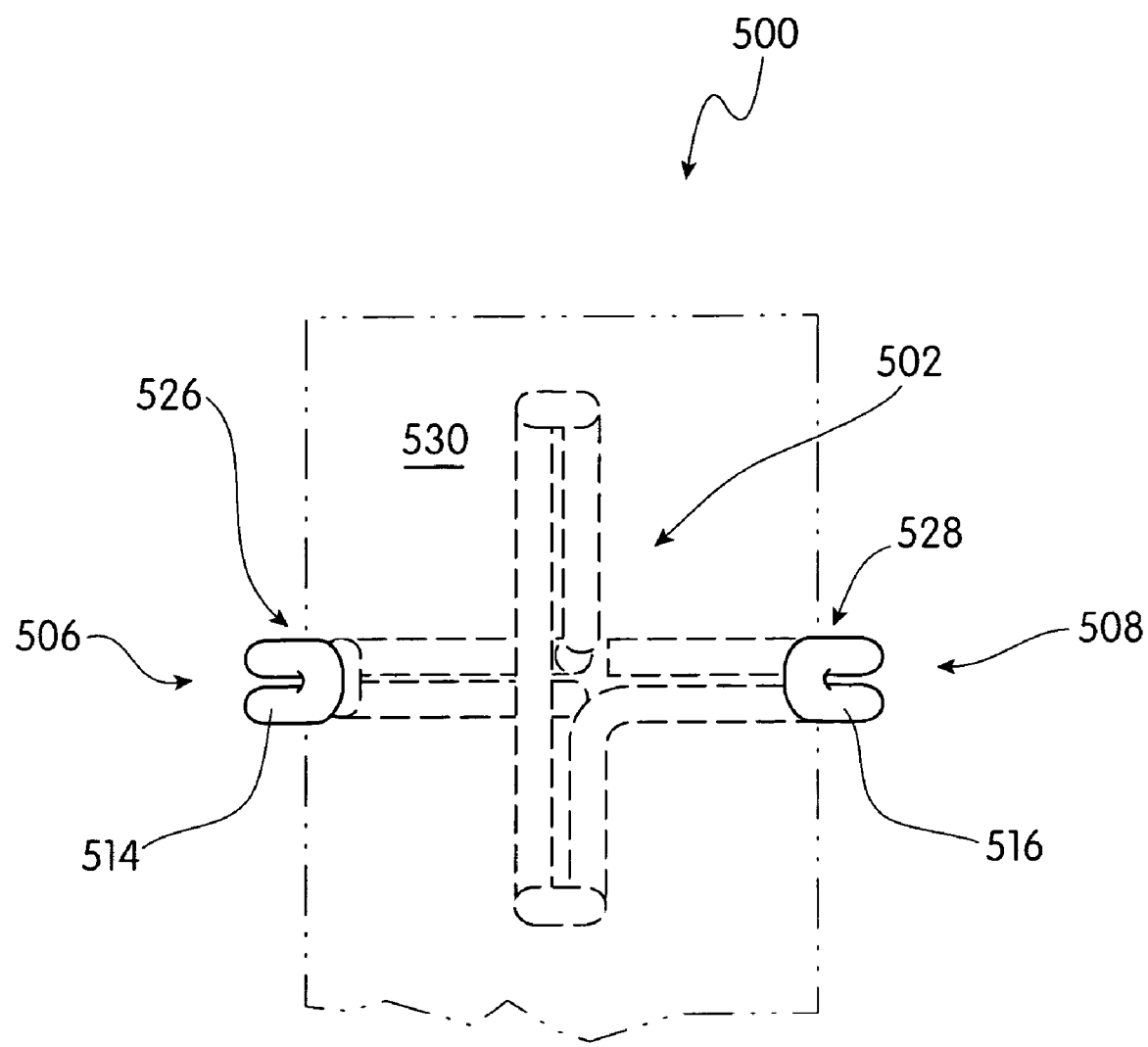
FIG. 7 is a bottom view of the mounting device shown in FIG. 5.
Figure 8:
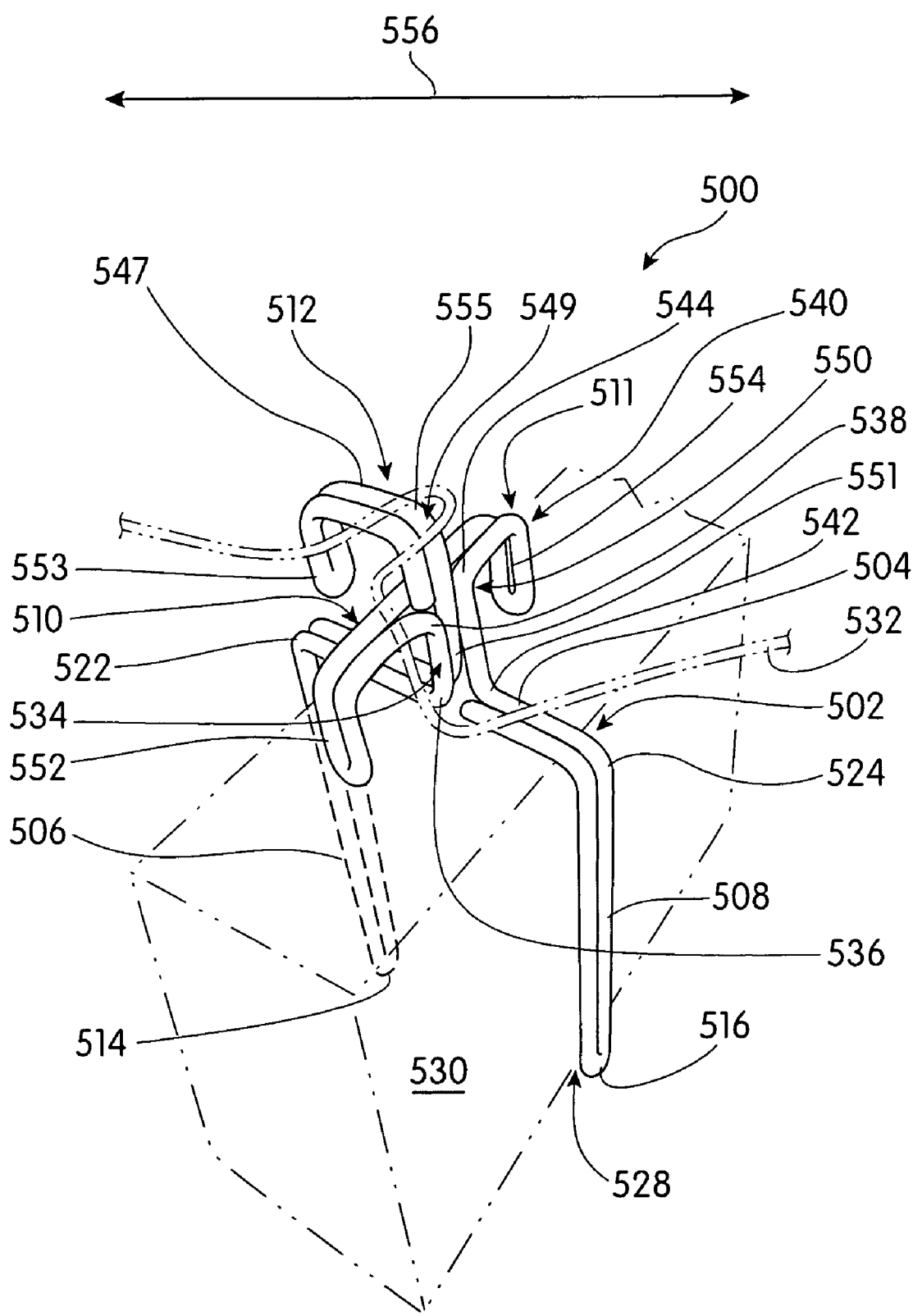
FIG. 8 is a perspective view of the mounting device shown in FIG. 5.

FIG. 5 is a side view showing another example of an implementation of a mounting device 500. FIG. 6 is a top view of the mounting device shown in FIG. 5. FIG. 7 is a bottom view of the mounting device shown in FIG. 5. FIG. 8 is a perspective view of the mounting device shown in FIG. 5. The mounting device 500 includes a mounting platform 502 having a base 504 and two resilient legs 506 and 508 extending from the base 504. The mounting device 500 further includes a first retaining mechanism 510, a second retaining mechanism 511, and a third retaining mechanism 512 all extending from the mounting platform 502. The two resilient legs 506 and 508 have free ends 514 and 516, respectively. A first distance between the resilient legs 506 and 508 is shorter than a second distance between the resilient legs 506 and 508 parallel to the first distance. In an example, a first distance between the resilient legs 506 and 508, indicated by a dotted line 518, may be shorter than a second distance between the resilient legs 506 and 508 indicated by a dotted line 520. The resilient legs 506 and 508 may be designed to be flexible, as well as resilient, such that the resilient legs 506 and 508 may have a tendency to restore the first distance indicated by the dotted line 518 following displacement of the free ends 514, 516 away from each other. The resilient legs 506, 508 may, for example, extend from ends 522, 524 of the base 504, or (not shown) the resilient legs 506, 508 may each independently extend from other positions on the base 504 between the ends 522, 524. In an example, the resilient legs 506, 508 may both extend from the base 504 in generally similar directions, and the dotted line 518 intersecting the free ends 514 and 516 may be parallel with the dotted line 520 intersecting the ends 522, 524. A distance between the free ends 514 and 516 indicated by the dotted line 518 may be shorter than a length of the base 504 between the ends 522, 524 indicated by the dotted line 520. The two resilient legs 506 and 508 form mutually opposing points of contact 526 and 528, respectively. The mutually opposing points of contact 526 and 528 are together capable of forming a friction fit pinching adjacent surfaces of a structure 530, securing the mounting device 500, including the first, second and third retaining mechanisms 510, 511 and 512 and the mounting platform 502, onto a structure 530. The free ends 514, 516 may be bent as shown in FIG. 7 so as to be able to curl around a structure 530, or (not shown) may be straight. In further examples (not shown), each of the mutually opposing points of contact 526 and 528 independently may be located at a selected position on the resilient legs 506, 508 respectively, between the base 504 and the free ends 514, 516 respectively. Either or both of the resilient legs 506, 508 may include more than one point of contact for securing the mounting device 500 on a structure 530.

The first, second and third retaining mechanisms 510, 511 and 512 may be positioned in sufficient mutual proximity extending from the mounting platform 502 so as to be together capable of extending at least part of a line article 532. The first, second and third retaining mechanisms 510, 511 and 512 may be together capable of so extending at least part of the line article 532 in any direction along at least part of such a structure 530. The first, second and third retaining mechanisms 510, 511 and 512 may together have these capabilities regardless of a direction in which the mounting device 500 is secured by the two resilient legs 506 and 508 on such a structure 530.

In a further example (not shown) the mounting device 500 may include a second mounting platform oriented orthogonally with respect to the mounting platform 502, having two additional resilient legs including two additional mutually opposing points of contact positioned for securing the mounting device 500 onto a structure 530. A mounting device 500 including two such mounting platforms 502 may be utilized, for example, to extend at least part of a line article 532 in any direction along at least part of an end of a structure 530, such as an end of a post. The structure 530 may be selected from among the examples of the structures 130 discussed above. The line article 532 may be selected from among the examples of the line articles 132 discussed above. It is understood by those skilled in the art that the mounting device 500 may be utilized with other structures 530 and other line articles 532, consistent with the above discussion of structures 130 and line articles 132 regarding the mounting device 100.

In an example, the mounting device 500 may include a limb 534 having a first limb end 536 and a second limb end 538. The first limb end 536 may extend from the mounting platform 502. The first limb end 536 may, for example, be oriented perpendicular to an adjacent part of the mounting platform 502. The second limb end 538 may be spaced apart from the mounting platform 502. The limb 534 may form part of the first retaining mechanism 510. In an additional example, the mounting device 500 may include a limb 540 having a first limb end 542 and a second limb end 544. The first limb end 542 may extend from the mounting platform 502. The first limb end 542 may, for example, be oriented perpendicular to an adjacent part of the mounting platform 502. The second limb end 544 may be spaced apart from the mounting platform 502. The limb 540 may form part of the second retaining mechanism 511. The mounting device 500 may include a limb 549 having a first limb end 551 and a second limb end 555. The first limb end 551 may extend from the mounting platform 502. The first limb end 551 may, for example, be oriented perpendicular to an adjacent part of the mounting platform 502. The second limb end 555 may be spaced apart from the mounting platform 502. The limb 549 may form part of the third retaining mechanism 512. Each of the limbs 534, 540, 549 may, for example, be mounted at selected positions extending from the mounting platform 502 and positioned in sufficient mutual proximity so as to be together capable of extending at least part of the line article 532 in any direction along at least part of such a structure 530. The limbs 534, 540, 549 may, for example, be mounted extending from the base 504, or (not shown) extending from the resilient leg 506 or extending from the resilient leg 508. The limbs 534, 540, 549 may be mounted extending from the mounting platform 502 in locations selected to leave adequate clearance between the resilient legs 506 and 508 for positioning the mounting device 500 on a structure 530. The limbs 534, 540, 549 may be mounted extending from the mounting platform 502 in locations selected so as not to interfere with utilization of the points of contact 526, 528 for positioning the mounting device 500 on a structure 530. In another example (not shown), the limbs 534, 540 and 549 may be combined together into a single limb 540 forming part of each of the first retaining mechanism 510, the second retaining mechanism 511, and the third retaining mechanism 512. It is understood that the mounting device 500 may include more than one such limb 540 (not shown) positioned in different locations extending from the mounting platform 502, each such limb 540 forming part of first, second and third retaining mechanisms 510, 511 and 512.

In an example, the first retaining mechanism 510 may include an arm 546 extending from the limb 534, and the second retaining mechanism 511 may include an arm 548 extending from the limb 540. The arms 546 and 548 may, for example, be mutually parallel. The arms 546 and 548 may together form a cross-piece 550 oriented transversely to and extending from the limbs 534, 540, and spaced apart from the mounting platform 502. The limbs 534, 540 and the arms 546 and 548 further may, as an example, together form a "T-shaped" element spaced apart from the mounting platform 502. In an additional example (not shown) the limb 534 may form part of both of the first and second retaining mechanisms 510, 511. The cross-piece 550 may be oriented perpendicular with respect to the limb 534 and coplanar with respect to part of the mounting platform 502 adjacent to the first limb end 536. The arms 546 and 548 may extend from the second limb ends 538, 544. As an example, the arm 546 may include an appendage 552, and the arm 548 may include an appendage 554. The appendages 552, 554 may extend toward the mounting platform 502. The appendages 552, 554 may, for example, extend sufficiently far toward the mounting platform 502 so as to make contact with a structure 530 when the mounting device 500 is secured by the resilient legs 506, 508 on a structure 530.

As an example, the third retaining mechanism 512 may include an arm 547 extending from the limb 549. The arms 546, 547 and 548 may extend in parallel planes from the limbs 534, 540, 549. The arms 546 and 548 may extend away from the limbs 534, 540 in opposite directions, and the arm 547 may extend away from the limb 549 in a direction orthogonal to such opposite directions. The limbs 534, 540, 549 and the arms 546, 547, 548 may together form a "cross-shaped" element spaced apart from the mounting platform 502. The arm 547 may, for example, be oriented perpendicular with respect to the limb 549 and coplanar with respect to part of the mounting platform 502 adjacent to the first limb end 542. The limbs 534, 540 and 549 may, for example, be integrated together. The arm 547 may include an appendage 553. The appendage 553 may extend toward the mounting platform 502.

The limbs 534, 540, 549, together with the cross-piece 550 positioned in proximity with the limbs 534, 540, 549 and spaced apart from the mounting platform 502, may be capable of extending at least part of a line article 532 in any direction along at least part of a structure 530. The limbs 534, 540, 549 and the cross-piece 550 may collectively facilitate weaving part of the line article 532 securely on the mounting device 500 regardless of a direction in which the mounting device 500 is mounted on the structure 530 and regardless of directions of travel 556 of the line article 532. As an example, part of the line article 532 may pass through the third retaining mechanism 512, over the limb 549, and through the first retaining mechanism 510

It is understood by those skilled in the art that FIG. 8 showing part of a line article 532 on a mounting device 500 is merely an example, and that part of a line article may be extended on the mounting device 500 in many other different orientations. It is understood by those skilled in the art that the figures showing a mounting device 500 oriented with limbs 534, 540, 549 above the base 504 are merely examples, and that the limbs 534, 540, 549 as well as the first, second and third retaining mechanisms 510, 511, 512 and the resilient legs 506, 508 may each independently be oriented horizontally, or downward, or at any other selected orientation between a vertically upward or downward or a horizontal position. It is further understood by those skilled in the art that a limb 534, 540, 549 may include more than three retaining mechanisms.

Lengths of the resilient legs 506, 508, a length of the base 504, lengths of the limbs 534, 540, 549, lengths of the arms 546, 547, 548 and of the appendages 552, 553, 554 may each independently be selected consistent with the earlier discussion of analogous dimensions of the mounting device 100. It is understood by those skilled in the art that these ranges of lengths are merely examples, and that other lengths may be utilized.

The first, second and third retaining mechanisms 510, 511, 512 may, for example, respectively include first, second and third hooks. The limb 534, the arm 546 and the appendage 552 may form parts of the first hook; the limb 540, the arm 548 and the appendage 554 may form parts of the second hook; and the limb 549, the arm 547 and the appendage 553 may form parts of the third hook. It is understood by those skilled in the art that the positions of the first, second and third hooks shown in the figures are merely examples, and that the first, second and third retaining mechanisms 510, 511, 512 may each independently be positioned at any selected orientation with respect to the mounting platform 502. In additional examples, the first, second and third retaining mechanisms 510, 511, 512 may each independently include, positioned on the mounting platform 502, on the limbs 534, 540, 549, on the arms 546, 547, 548, or on the appendages 552, 553, 554, a hook, fastener, bolt, buckle, clamp, clip, hasp, latch, catch, holder, or the like. The first, second and third retaining mechanisms 510, 511, 512 may each independently have selected dimensions and a selected overall size, which may be the same or different. As another example (not shown), the first, second and third retaining mechanisms 510, 511, 512 may each independently be removeably attachable to, or permanently attached to but selectively moveable on, the mounting platform 502, the limbs 534, 540, 549, the arms 546, 547, 548, or the appendages 552, 553, 554. In such an example, the first, second and third retaining mechanisms 510, 511, 512 may be repositionable or reconfigurable on the mounting platform 502. Any or all of the base 504, the resilient legs 506, 508, the limbs 534, 540, 549, the arms 546, 547, 548, and the appendages 552, 553, 554 may include (not shown) recesses for attachment of retaining mechanisms 510, 511, 512 each in the form of a hook, fastener, bolt, buckle, clamp, clip, hasp, latch, catch, holder, or the like. The retaining mechanisms 510, 511, 512 may include (not shown) securing mechanisms for their removable attachment at predetermined or randomly selected positions to any or all of the base 504, the resilient legs 506, 508, the limbs 534, 540, 549 the arms 546, 547, 548, and the appendages 552, 553, 554.

Figure 9:
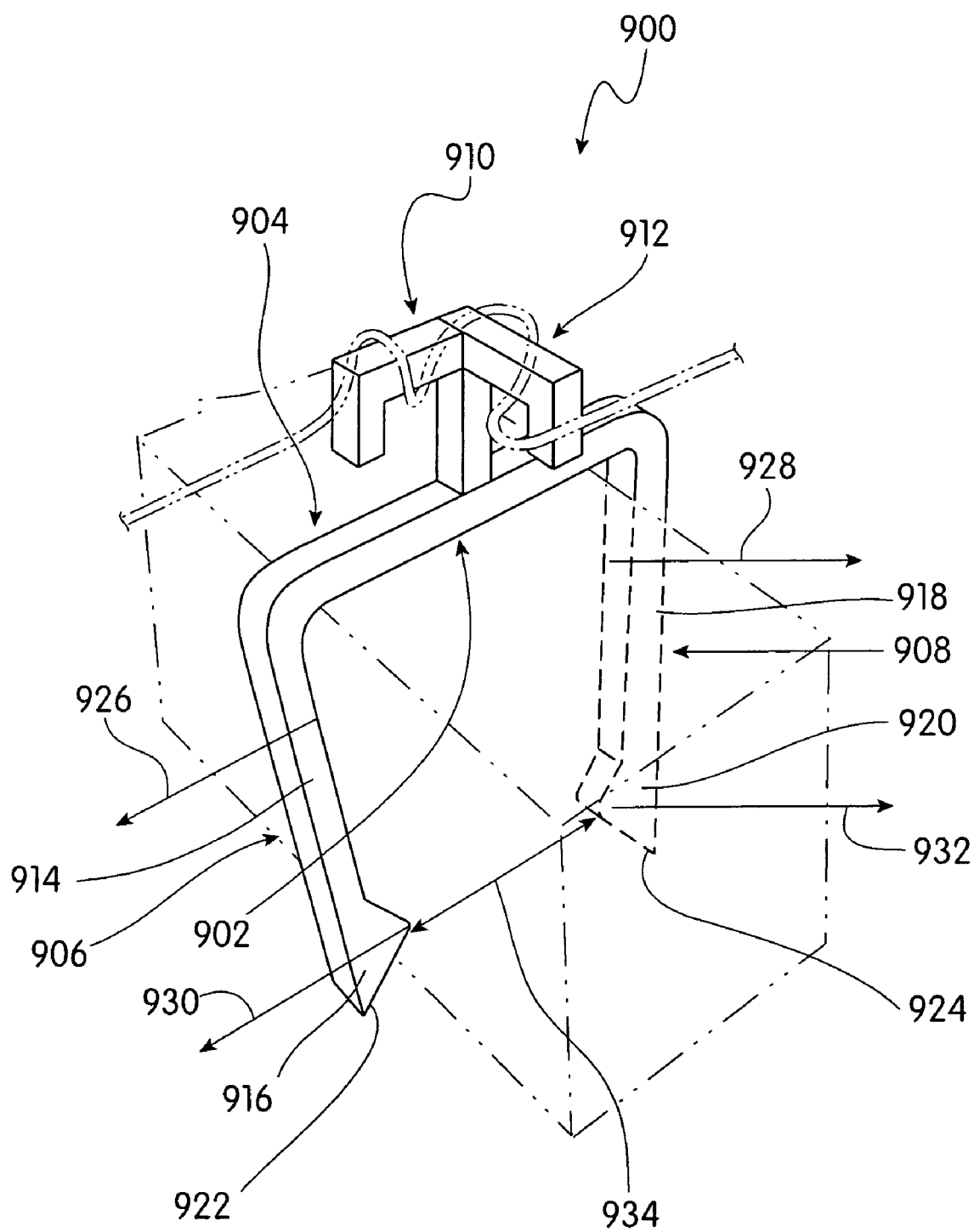
FIG. 9 is a perspective view of another example of a mounting device.

FIG. 9 is a perspective view of another example of a mounting device 900. The mounting device 900 may include a mounting platform 902 having a base 904 and two resilient legs 906 and 908 extending from the base 904. The mounting device 900 may further include a first retaining mechanism 910 and a second retaining mechanism 912 both extending from the mounting platform 902. In a further example (not shown) the mounting device 900 may include a third retaining mechanism extending from the mounting platform 902. The resilient leg 906 may, for example, include a rod region 914 and an end region 916; and the resilient leg 908 may, for example, include a rod region 918 and an end region 920. The end regions 916 and 920 may include free ends 922 and 924, respectively. Each of the rod regions 914, 918 may have a first cross-sectional area defined in the directions of the arrows 926 and 928, respectively. Each of the end regions 916, 920 may have a second cross-sectional area defined in the directions of the arrows 930 and 932, respectively. The first and second cross-sectional areas may, for example, each independently be square, round, rectangular, elliptical, or polygonal. The first cross-sectional area may be defined as an average cross-sectional area of the rod regions 914, 918. The first cross-sectional area may, for example, be a rectangle having length and width dimensions selected to provide the rod regions 914, 918 with adequate strength. As an example, lengths and widths of first cross sectional rectangular areas of the rod regions 914, 918 may each independently be within a range of between about ¼ inch and about ⅜ inch. The second cross-sectional area may be defined as a maximum cross-sectional area within each of the end regions 916 and 920, in directions parallel to the directions of the arrows 930, 932. The second cross-sectional area may, for example, be greater than the first cross-sectional area. A minimum distance between the end regions 916, 920 defined by the arrow 934 may, for example, be a shortest distance between the resilient legs 906, 908. The distance defined by the arrow 934 may be selected to grip a structure (not shown) onto which the mounting device 900 may be secured. The distance defined by the arrow 934 may, for example, be within a range of between about ½ inch and about 3 inches. The length of the base 904 and of the resilient legs 906, 908, may be as discussed with respect to the base and resilient legs of the mounting devices 100 and 500. As another example, the base 904 may have a length within a range of between about 1 inch and about 3 inches, and the resilient legs 906, 908 may have lengths from the base 904 to the free ends 922, 924 within a range of between about 1 inch and about 3 inches. It is understood by those skilled in the art that a mounting device 100, 500 may be modified to include resilient legs each having a rod region and an end region in a manner analogous to the structure of the mounting device 900. Such resilient legs may, for example, be molded or tooled. The mounting devices 100, 500, 900 may be formed, for example, from one or more flexible, resilient materials such as metals, polymers, and cellulosic materials. Steel, aluminum, polyester, polypropylene, and paper, as examples, may be utilized in fabricating the mounting devices 100, 500, 900. It is understood by those skilled in the art that other flexible, resilient materials may be utilized. The mounting devices 100, 500, 900 may be fabricated in a variety of colors for blending and contrasting with structures 130, 530.

Figure 10:
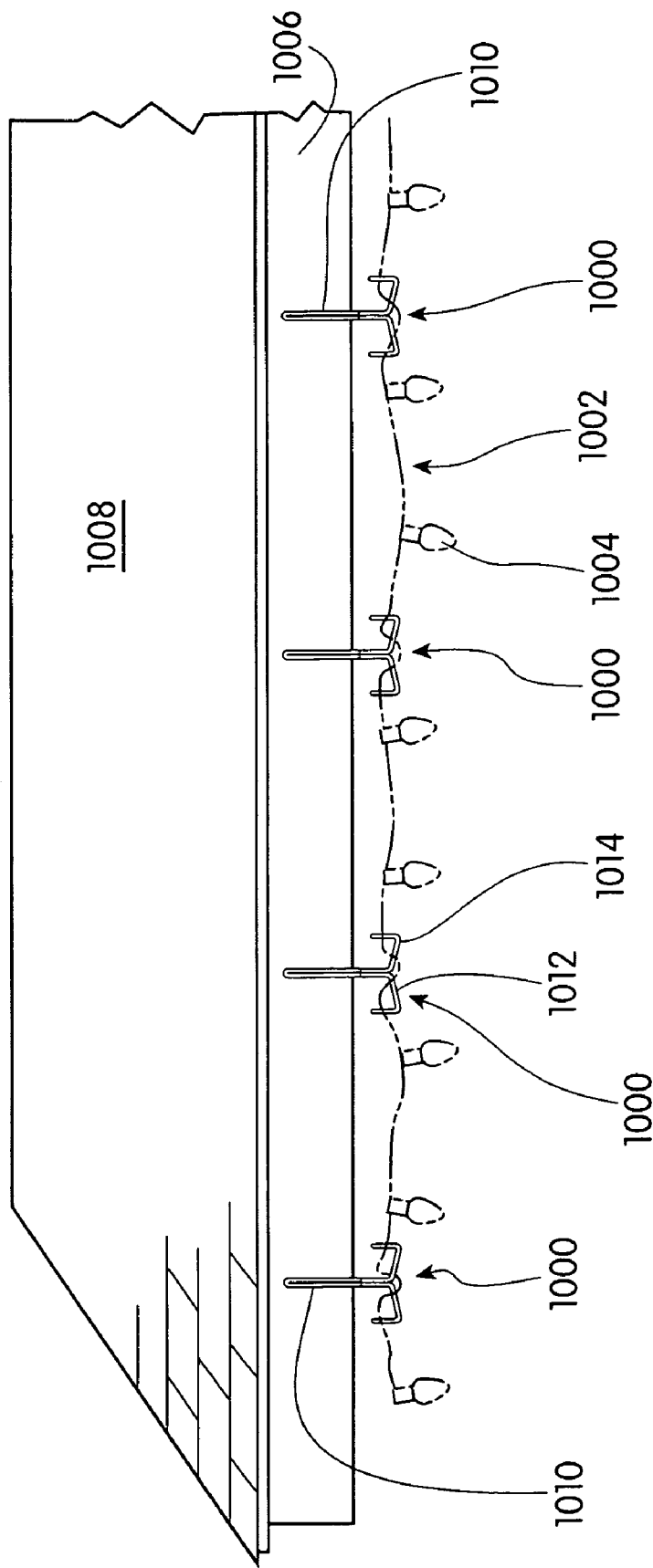
FIG. 10 is a front view of one example of how a plurality of mounting devices for extending a line article may be utilized to hang a string of decorative lights along a fascia board on a house.

FIG. 10 is a front view of one example of how a plurality of mounting devices 1000 for extending a line article 1002 may be utilized to hang a string of decorative lights 1004 along a fascia board 1006 on a house 1008. As previously described, each of the mounting devices 1000 may include a mounting platform (not shown) having a base (not shown) and two resilient legs 1010 extending from the base. Each of the mounting devices 1000 may further include, for example, a first retaining mechanism 1012 and a second retaining mechanism 1014 both extending from the mounting platform. In a further example (not shown), some or each of the mounting devices 1000 may include a third retaining mechanism extending from the mounting platform. The mounting devices 1000 may be easily positioned in selected spaced apart locations onto the fascia board 1006 by spreading apart the two resilient legs 1010 of each mounting device 1000 and sliding the resilient legs 1010 onto the fascia board 1006. The mounting devices 1000 may collectively secure and position a portion of the line article 1002 along the fascia board 1006 so that the decorative lights 1004 are each positioned in a selected orientation that is visible and aesthetically pleasing. Each of the decorative lights 1004 may have a different orientation on the fascia board 1006 than other decorative lights 1004, and the line article 1002 may be woven through the first and second retaining mechanisms 1012 and 1014 of each of the mounting devices 1000 in a different manner than through first and second retaining mechanisms 1012, 1014 extending from other mounting devices 1000. While effectively facilitating display of the decorative lights 1004, the mounting devices 1000 may also be easily removable from the fascia board 1006 when display of the decorative lights ends, without a need for the use of removal tools, and without damaging the fascia board 1006 or the line article 1002. It is understood by those skilled in the art that any of the other mounting devices 100, 500, 900 disclosed in this application may likewise be secured onto the fascia board 1006 and utilized to extend the line article 1002 along the fascia board 1006 on the house 1008. It is further understood by those skilled in the art that FIG. 10 is merely an example of utilization of the mounting devices 1000, and that many other end-utilization modes are contemplated as discussed in this application.

The foregoing description of implementations has been presented for purposes of illustration and description. It is not exhaustive and does not limit the claimed inventions to the precise forms disclosed. Modifications and variations are possible in light of the above description or may be acquired from practicing the invention. For example, the described implementations include examples of configurations of retaining mechanisms but the invention may be implemented with other arrangements and quantities of retaining mechanisms. In addition to the device features described in this document, those skilled in the art will recognize that other features may be included or offered in connection with the devices and should be viewed as within the scope of this invention. The claims and their equivalents define the scope of the invention.

What is claimed is:

1. A mounting device for extending at least part of a line article along at least part of a structure, the mounting device comprising:
   a mounting platform including a base and two resilient legs extending from the base;
   first and second retaining mechanisms extending from the mounting platform;
   a limb having first and second limb ends, the first limb end on and extending from the mounting platform, the second limb end spaced apart from the mounting platform, the limb forming part of both of the first and second retaining mechanisms;
   a cross-piece on the limb and spaced apart from the mounting platform, the cross-piece oriented transversely to and having first and second arms extending from the limb, the cross-piece forming part of both of the first and second retaining mechanisms;
   each of the two resilient legs having a free end, a first distance between the two resilient legs being shorter than a second distance between the two resilient legs parallel to the first distance, the two resilient legs together forming mutually opposing points of contact capable of securing the mounting device, including the first and second retaining mechanisms and the mounting platform, onto a structure;
   where the first and second retaining mechanisms are mutually positioned to be together capable of extending at least part of a line article in any direction along at least part of such a structure, regardless of a direction in which the mounting device is secured by the two resilient legs on such a structure.

2. The mounting device of claim 1, where the first and second arms are oriented in mutually perpendicular directions.

3. The mounting device of claim 1, where each of the first and second arms includes an appendage extending toward the mounting platform.

4. The mounting device of claim 1, where the first retaining mechanism includes a first hook, the second retaining mechanism includes a second hook, and the limb and cross-piece form parts of the first and second hooks.

5. The mounting device of claim 1, including a third retaining mechanism extending from the mounting platform, where the first, second and third retaining mechanisms are mutually positioned to be together capable of extending at least part of a line article in any direction along at least part of such a structure, regardless of a direction in which the mounting device is secured by the two resilient legs on such a structure.

6. The mounting device of claim 5, including a cross-piece on the limb and spaced apart from the mounting platform, the cross-piece oriented transversely to and having first and second arms extending from the limb, the cross-piece forming part of both of the first and second retaining mechanisms.

7. The mounting device of claim 6, where the first and second arms are oriented in mutually parallel directions, the limb and the cross-piece together forming a T-shaped member.

8. The mounting device of claim 6, where each of the first and second arms includes an appendage extending toward the mounting platform.

9. The mounting device of claim 6, where the first retaining mechanism includes a first hook, the second retaining mechanism includes a second hook, and the limb and cross-piece form parts of the first and second hooks.

10. The mounting device of claim 9, where the third retaining mechanism includes a third hook, and the limb forms part of the third hook.

11. The mounting device of claim 6, where the cross-piece is interposed between the first and second limb ends, the limb forming part of each of the first, second and third retaining mechanisms.

12. The mounting device of claim 11, where the first and second arms are oriented in mutually parallel directions, the limb and the cross-piece together forming a cross-shaped member.

13. The mounting device of claim 11 where the third retaining mechanism includes a third arm.

14. The mounting device of claim 13 where the third arm is oriented perpendicular to the first and second arms.

15. The mounting device of claim 13 where the third arm includes an appendage extending toward the mounting platform.

16. The mounting device of claim 1, where each resilient leg includes a rod region and an end region, the end region defining a minimum distance between the resilient legs.

17. The mounting device of claim 16, where a cross-sectional area of the rod regions defined in a direction transverse to a rod length is smaller than a cross-sectional area of the end regions defined in the same direction.

18. A mounting device for extending at least part of a line article along at least part of a structure, the mounting device comprising:
   a mounting platform including a base and two resilient legs extending from the base;
   first, second and third retaining mechanisms extending from the base of the mounting platform, where the first, second and third retaining mechanisms that are mutually positioned to be together and that all include hooks that extend outward from the base in different directions capable of extending at least part of a line article in any direction along at least part of such a structure, regardless of a direction in which the mounting device is secured by the two resilient legs on such a structure; and
   each of the two resilient legs having a free end, a first distance between the two resilient legs being shorter than a second distance between the two resilient legs parallel to the first distance, the two resilient legs together forming mutually opposing points of contact capable of securing the mounting device, including the first and second retaining mechanisms and the mounting platform, onto a structure;
   where the first and second retaining mechanisms are mutually positioned to be together capable of extending at least part of a line article in any direction along at least part of such a structure, regardless of a direction in which the mounting device is secured by the two resilient legs on such a structure.

\* \* \* \* \*